(12) United States Patent
Haan et al.

(10) Patent No.: US 8,774,709 B1
(45) Date of Patent: Jul. 8, 2014

(54) N VIRTUAL CHANNEL RADIO

(75) Inventors: Benjamin J Haan, Marion, IA (US); Aaron J Smith, Marion, IA (US); James M Herlocker, Cedar Rapids, IA (US); Joe E Clark, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 433 days.

(21) Appl. No.: 13/194,460

(22) Filed: Jul. 29, 2011

(51) Int. Cl.
*H04B 7/15* (2006.01)

(52) U.S. Cl.
USPC .......................................... 455/11.1; 455/518

(58) Field of Classification Search
USPC ........................ 455/11.1, 13.1, 7, 15, 16, 12.1
See application file for complete search history.

(56) References Cited

U.S. PATENT DOCUMENTS

| | | | | |
|---|---|---|---|---|
| 7,233,770 | B2 * | 6/2007 | Williamson et al. | 455/7 |
| 2010/0279602 | A1 * | 11/2010 | Larsson et al. | 455/7 |

* cited by examiner

*Primary Examiner* — Tu X Nguyen
(74) *Attorney, Agent, or Firm* — Donna P. Suchy; Daniel M. Barbieri

(57) ABSTRACT

A radio system allowing radios in a network to utilize functionality of other radios in the network includes a plurality of radios each having the capability to communicate with other radios in the network, and each having functionality that is not common to every other radio in the network. Radios send requests to other radios in the network to re-transmit a signal using a specific transmission mode.

18 Claims, 8 Drawing Sheets

N VIRTUAL CHANNEL RADIO

GOVERNMENT LICENSE RIGHTS

The U.S. Government has a paid-up license in this invention and the right in limited circumstances to require the patent owner to license others on reasonable terms as provided by the terms of FA8650-05-C-7214 awarded by the Air Force Research Laboratory.

FIELD OF THE INVENTION

The present invention is directed generally toward radio communication, and more particularly toward networks of radio transmitters/receivers.

BACKGROUND OF THE INVENTION

Modern radio communication involves numerous transmission modes. Each mode may require specialized hardware. In some contexts a single user may wish to utilize multiple modes to accomplish a single task; for example, in a battlefield situation, a soldier may need to communicate with individuals locally and with a strategic coordination system through a satellite.

With appropriate hardware and software, a single radio can operate in more than one mode, but no single portable radio can operate in all of the modes necessary for modern radio communication. The hardware necessary to operate in even a few modes may be prohibitively expensive, and the resulting radio too heavy to be easily mobile.

In many circumstances a number of radios may be organized into a radio network. Radio networks may include radios having all of the necessary modes of transmission, but those radios may be dispersed over a large area such that an individual operator may not have access to every radio.

Consequently, it would be advantageous if a system and apparatus existed that is suitable for conveniently utilizing various transmission modes available in a radio network from anywhere else in the network.

SUMMARY OF THE INVENTION

Accordingly, the present invention is directed to a novel system and apparatus for conveniently utilizing various transmission modes available in a radio network from anywhere else in the network.

One embodiment of the present invention includes a radio configured to communicate with other radios and send a request to those other radios to re-transmit a signal whenever a user wishes to transmit a signal by a certain mode or frequency beyond the capabilities of the radio. The radio may also be configured to receive requests from those other radios to re-transmit signals by a certain mode or frequency beyond the capabilities of those other radios but within that radio's own capabilities.

Another embodiment of the present invention includes a network of radios configured to communicate with each other and share transmission capabilities as though such capabilities where native to each radio. Requests to re-transmit a signal may relay through multiple nodes in the network to reach a radio having the desired capabilities.

Another embodiment of the present invention includes a method of transmitting a signal by a certain mode or frequency by relaying the signal through a network of radios to a radio having the desired transmission capabilities.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
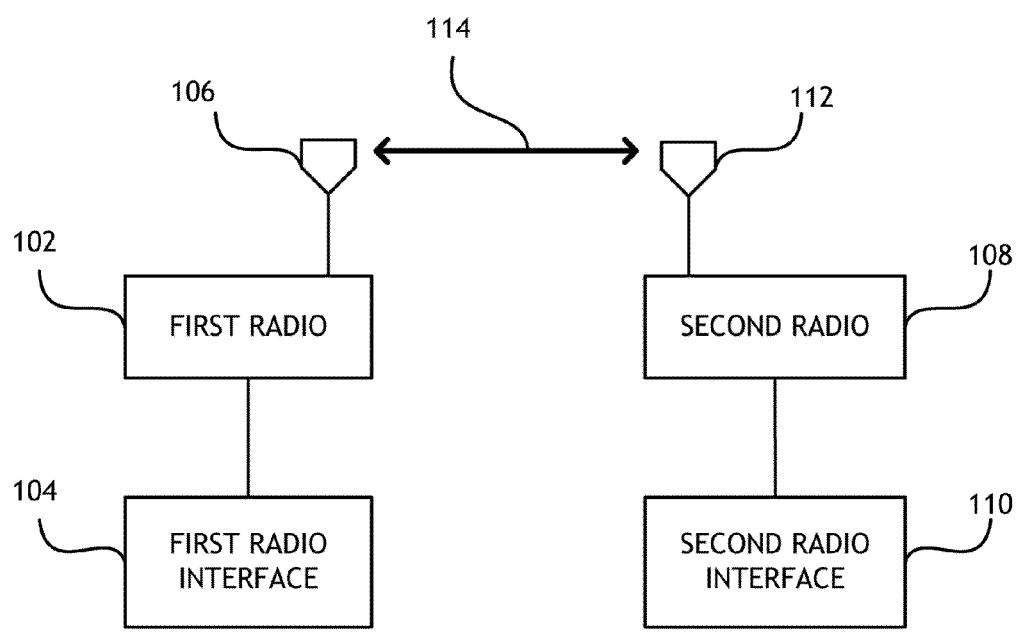
FIG. 1 shows a block diagram of two radios communicating directly.

Referring to FIG. 1, a first radio 102 having an interface 104 and an antenna 106 may directly communicate with a second radio 106 having an interface 110 and an antenna 112. The first radio 102 and the second radio 108 must be configured to send and receive signals 114 having comparable waveforms in comparable modes of communication. Each interface 104 and 110 may comprise a Push-to-Talk (PTT) box, a data link or some other mechanism for imparting a voice or data stream which each radio 102 and 108 may convert into a signal 114. Each interface 104 and 110 may also include controls as necessary to adjust the configuration and operation of each radio 102 and 108.

Figure 2:
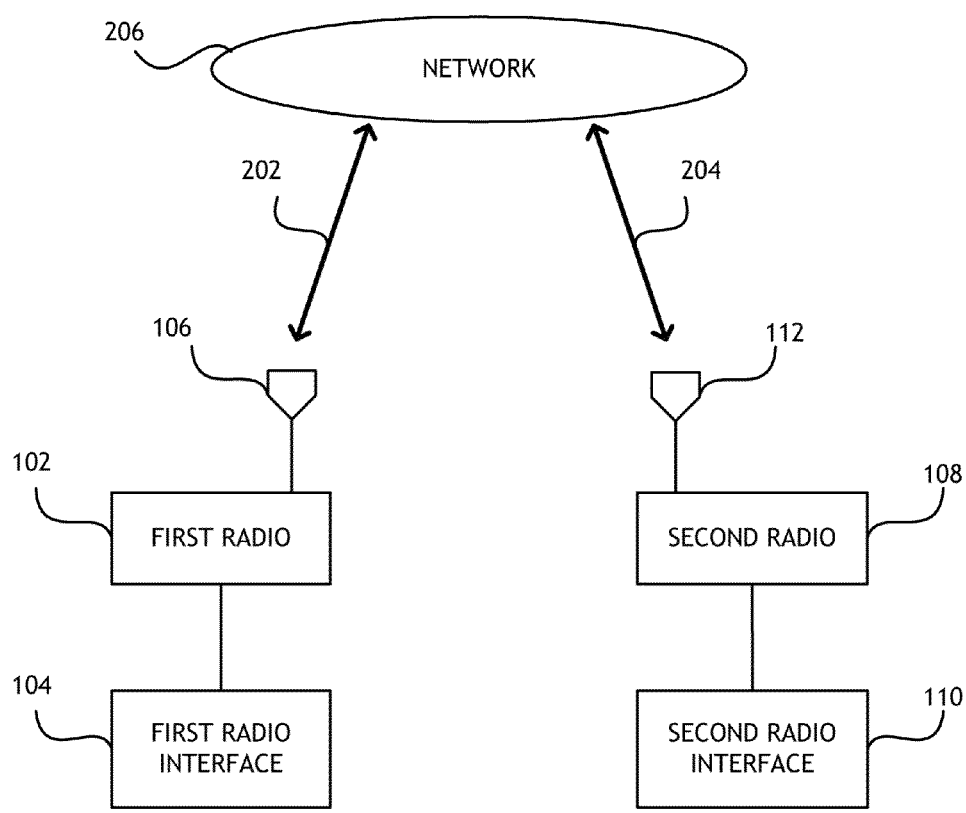
FIG. 2 shows a block diagram of two radios communicating through a network.

Referring to FIG. 2, a first radio 102 having an interface 104 and an antenna 106 may communicate through a network 206 with a second radio 106 having an interface 110 and an antenna 112. The network 206 may comprise devices (nodes) incorporating Quint Networking Technology (QNT). The first radio 102 and the second radio 108 must be configured to send and receive signals 202 and 204 understandable to the network 206. Each node in the network 206 may comprise a radio, a switch incorporated into a physical communications infrastructure, or any other device capable of relaying signals. At least one node in the network 206 must be capable of receiving a signal 202 from the first radio 102, and at least one node in the network 206 must be capable of sending a signal 204 to the second radio 108

Figure 3:
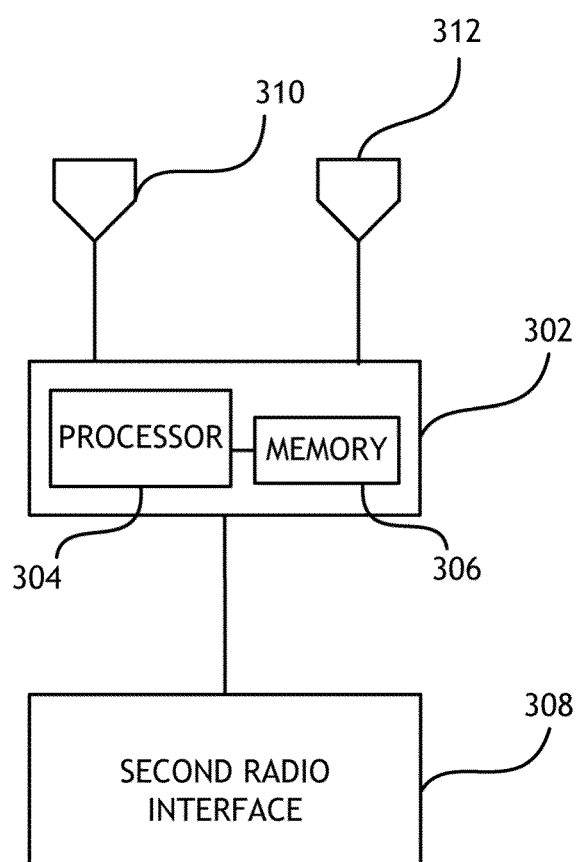
FIG. 3 shows a block diagram of a radio according to one embodiment of the present invention.

Referring to FIG. 3, a radio 302 according to the present invention may have a processor 304, memory 306, an interface 308 and one or more antennas 310 and 312. The radio 302 may be configured to send and receive signals having one or more waveforms in one or more modes of operation. For example, the radio 302 may be configured to operate using the HAVE QUICK (HQ) system, the SINGCARS (SG) system, Satcom (SC), some other communication mode, or any combination thereof. The radio 302 may operate in at least one mode and in at least one channel that is accessible to other radios in a network of radios ("Common Mode"), and in at least one mode that may not be generally accessible to other radios in the network of radios ("Specific Mode"). The processor 304 may receive a signal and a request in the Common Mode to re-transmit the signal in the Specific Mode. The radio 302 may include an antenna 310 configured for the Common Mode and an antenna 312 configured for the Specific Mode where the Common Mode and Specific Mode require different antenna configurations.

The processor 304 may automatically re-transmit a signal in the Specific Mode when the processor 304 receives a request to do so in the Common Mode. The processor 304 may be dynamically configurable through the interface 308 to broadcast the radio's 302 ability to receive and re-transmit signals in the Specific Mode, or to refuse to re-transmit signals. An operator may thereby decide to make the radio 302 available to re-transmit signals or not at the operator's discretion. The processor 304 may also be dynamically configurable through a signal received through the one or more antennas 310 and 312 to broadcast the radios 302 ability to receive and re-transmit signals in the Specific Mode, or to refuse to re-transmit signals. A superior authority may thereby override an operator's decision to make the radio 302 available or unavailable to re-transmit.

Figure 4:
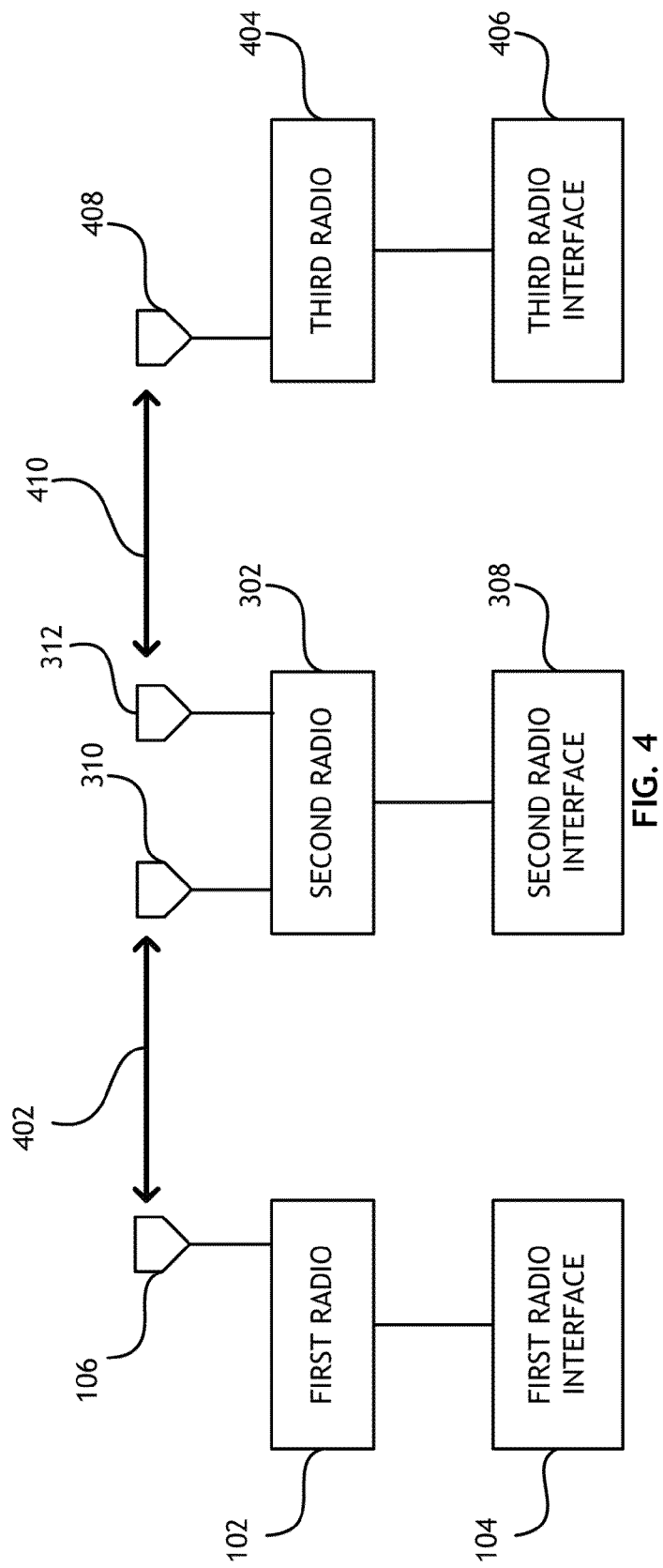
FIG. 4 shows a block diagram of one embodiment of the present invention wherein two radios communicate through an intermediary.

Referring to FIG. 4, an embodiment of the present invention is shown whereby a first radio 102 may send a signal to a third radio 404 through an intermediary second radio 302. The first radio 102 may include an interface 104 and an antenna 106. The first radio 102 may send and receive signals 402 in a Common Mode. The second radio 302 may include an interface 304 and one or more antennas 310 and 312. The second radio 302 may send and receive signals 402 and 410 in a Common Mode and a Specific Mode. The third radio 404 may include an interface 406 and an antenna 408. The third radio 404 may send and receive signals 410 in a Specific Mode. An operator using the first radio 102 and wishing to send a signal either by a Specific Mode beyond the capabilities of the first radio 102, or to a radio configured to receive signals by a Specific Mode beyond the capabilities of the first radio 102, may send the signal 402 with a request to re-transmit the signal 402 in a Specific Mode to the second radio 302 which is configured to send and receive signals 402 and 410 in at least the Specific Mode and a mode within the capabilities of the first radio 102. The processor 304 in the second radio 302 may then execute the request to re-transmit the signal 402 by the Specific Mode. The third radio 404 may received the re-transmitted signal 410. The second radio 302 automatically relays a signal from the first radio 102 to the third radio 404 in a mode compatible with the third radio 404.

In addition to relaying a signal from the first radio 102 to the second radio 404, this embodiment may also function to route signals around an obstacle which would otherwise impede communication between the first radio 102 and the third radio 404. For example; where the second radio 302 is in the line of site of both the first radio 102 and the third radio 404, but the first radio 102 is not in the line of site of the third radio 404, this embodiment may maintain a connection between the first radio 102 and the third radio 404.

In this embodiment, the second radio 302 does not perform any conversion between message sets; the second radio 302 functions only as a conduit to switch a signal from the Common Mode to the Specific Mode. Likewise, the second radio 302 does not decrypt, decode or otherwise manipulate the signal 402; the first radio 102 and the third radio 404 must have compatible security features.

Figure 5:
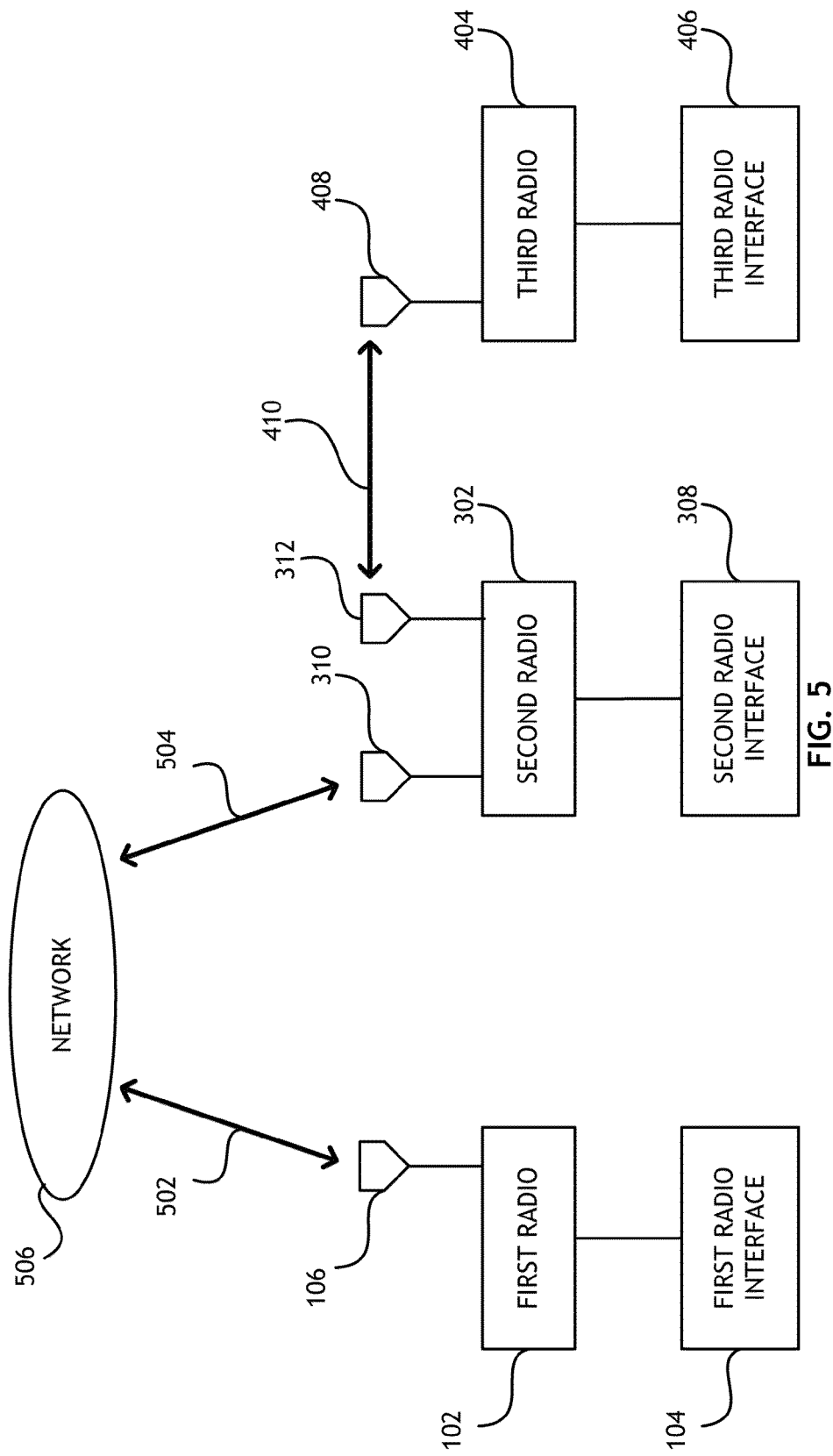
FIG. 5 shows a block diagram of one embodiment of the present invention wherein two radios communicate through an intermediary and a network.

Referring to FIG. 5, another embodiment of the present invention is shown whereby a first radio 102 may send a signal to a third radio 404 through an intermediary second radio 302 where the first radio 102 communicates with the second radio 302 through a network 506. The first radio 102 may include an interface 104 and an antenna 106. The first radio 102 may send and receive signals 502 in a Common Mode through a network 506 comprised of devices for relaying and transmitting signals. The second radio 302 may include an interface 304 and one or more antennas 310 and 312. The second radio 302 may send and receive signals 504 and 410 in a Common Mode and a Specific Mode. The second radio may also communicate through a network 506 comprised of devices for relaying and transmitting signals. The third radio 404 may include an interface 406 and an antenna 408. The third radio 404 may send and receive signals 410 in a Specific Mode. An operator using the first radio 102 and wishing to send a signal either by a Specific Mode beyond the capabilities of the first radio 102, or to a radio configured to receive signals by a Specific Mode beyond the capabilities of the first radio 102, may send the signal 502 with a request to re-transmit the signal 502 by a Specific Mode to the second radio 302 through a network 506 comprised of devices for relaying and transmitting signals. The first radio 102 may communicate with the network 506 via a signal 502 in a Common Mode. The network may route the signal as necessary and send a corresponding signal 504 in a Common Mode to the second radio 302. The processor 304 in the second radio 302 may then execute the request to re-transmit the signal 410 by the Specific Mode. The third radio 404 may received the re-transmitted signal 410. The second radio 302 relays a signal from the first radio 102, received through a network 506, to the third radio 404 in a mode compatible with the third radio 404.

In addition to relaying a signal from the first radio 102, through a network 506 to the second radio 404, this embodiment may also function to route signals around an obstacle which would otherwise impede communication between the first radio 102, the second radio 302 and the third radio 404. For example; where the second radio 302 is in the line of site of the third radio 404, but the first radio 102 is not in the line of site of the second radio 302 or the third radio 404, this embodiment may maintain a connection between the first radio 102 and the third radio 404 by routing signals through a network 506 traversing the obstacle.

Figure 6:
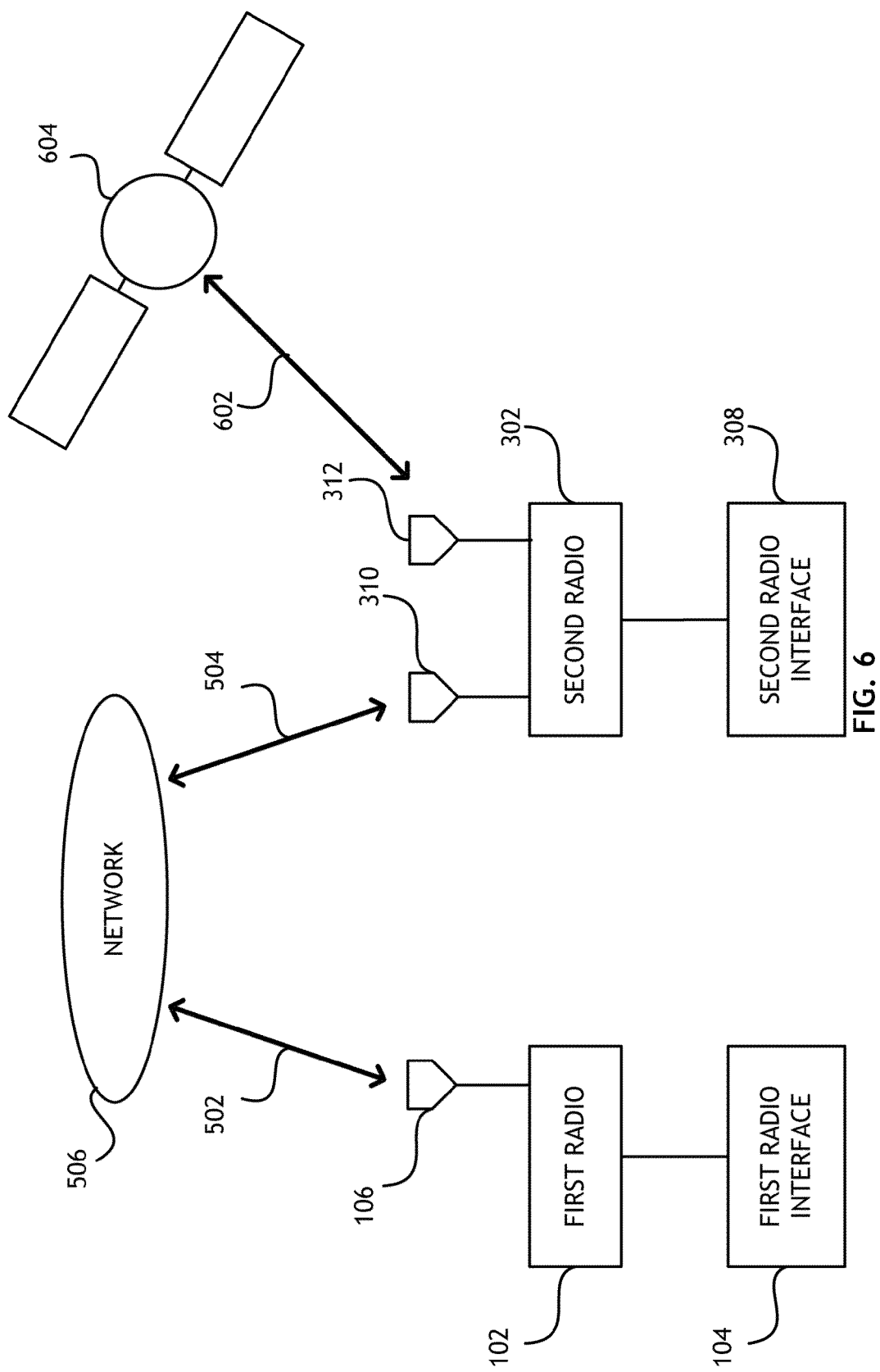
FIG. 6 shows a block diagram of one embodiment of the present invention wherein a radio communicates with a satellite through an intermediary and a network.

Referring to FIG. 6, another embodiment of the present invention is shown whereby a first radio 102 may send a signal to a satellite 604 through an intermediary second radio 302 where the first radio 102 communicates with the second radio 302 through a network 506. The first radio 102 may include an interface 104 and an antenna 106. The first radio 102 may send and receive signals 502 in a Common Mode through a network 506 comprised of devices for relaying and transmitting signals. The second radio 302 may include an interface 304 and one or more antennas 310 and 312. The second radio 302 may send and receive signals 504 and 602 in a Common Mode and a Specific Mode. The second radio may also communicate through a network 506 comprised of devices for relaying and transmitting signals. In this embodiment, the second radio 302 may send and receive signals 602 to and from a satellite 604. An operator using the first radio 102 and wishing to send a signal to a satellite 604 may send the signal 502 with a request to re-transmit the signal 502 by a mode compatible with the satellite 604 to the second radio 302 through a network 506 comprised of devices for relaying and transmitting signals. The first radio 102 may communicate with the network 506 via a signal 502 in a Common Mode. The network may route the signal as necessary and send a corresponding signal 504 in a Common Mode to the second radio 302. The processor 304 in the second radio 302 may then execute the request to re-transmit the signal 504 by a mode compatible with the satellite 604. The satellite 604 may received the re-transmitted signal 602. The second radio 302 relays a signal from the first radio 102, received through a network 506, to the satellite 604 in a mode compatible with the satellite 604.

Figure 7:
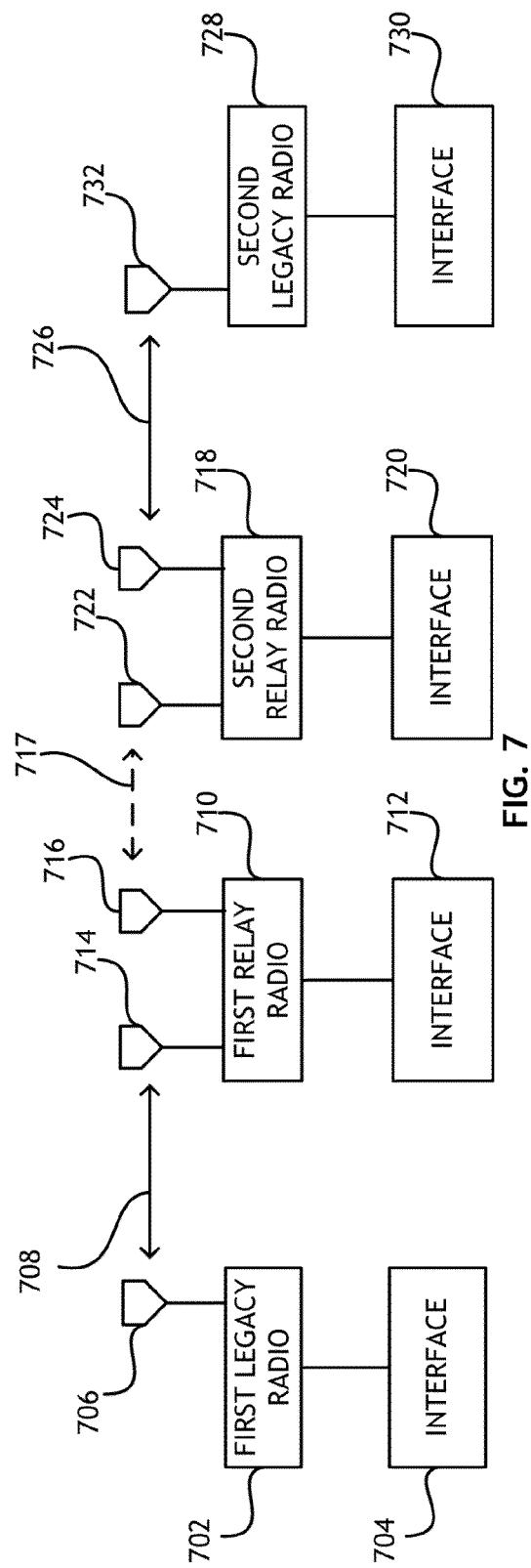
FIG. 7 shows a block diagram of one embodiment of the present invention wherein two legacy radios operating in different modes may communicate.

Referring to FIG. 7, another embodiment of the present invention is shown whereby two legacy radios 702 and 728, each communicating in a different mode and neither capable of communicating in a Common Mode may communicate with each other through two or more relay radios 710 and 718. The first legacy radio 702 may include an interface 704 and an antenna 706. The first legacy radio 102 may send and receive signals 708 in a Specific Mode. The first relay radio 710 may include an interface 712 and one or more antennas 714 and 716. The first relay radio 710 may send and receive signals 708 and 717 in a Common Mode and the same Specific Mode as the first legacy radio 102. The second relay radio 718 may include an interface 720 and one or more antennas 722 and 724. The second relay radio 718 may send and receive signals 717 and 726 in a Common Mode and a different Specific Mode than the first legacy radio 102. The second legacy radio 728 may include an interface 730 and an antenna 732. The second legacy radio 728 may send and receive signals 410 in the same Specific Mode as the second relay radio 718. An operator using the first legacy radio 702 and wishing to send a signal to the second legacy radio 728 may send the signal 708 with a request to re-transmit the signal 708 in a Specific Mode to the first relay radio 710 which is configured to send and receive signals 708 and 717 in at least the same Specific Mode as the first legacy radio 702 and a Common Mode. In this embodiment, the first relay radio 710 may not have the capability to relay the signal 708 directly to the second legacy radio 728 because the Specific Mode of the second legacy radio 728 may be beyond the capabilities of the first relay radio 710. The processor 304 in the first relay radio 710 may then retransmit the signal 708 in a Common Mode either directly the second relay radio 718, of the first relay radio 710 may retransmit the signal 708 in a Common Mode to the second relay radio 718 through one or more other relay radios (not shown) or through a network (not shown) configured to route the signal 708. The second relay radio 718 may received the re-transmitted signal 717 through whatever transmission path and transmit the re-transmitted signal 717 by a Specific Mode within the capabilities of the second legacy radio 728. The second legacy radio 728 may then receive the further re-transmitted signal 726 by the Specific Mode. The first relay radio 710 and the second relay radio 718 automatically relay a signal from the first legacy radio 702 to the second legacy radio 728 even though the first legacy radio 702 and the second legacy radio 728 operate in incompatible Specific Modes.

Figure 8:
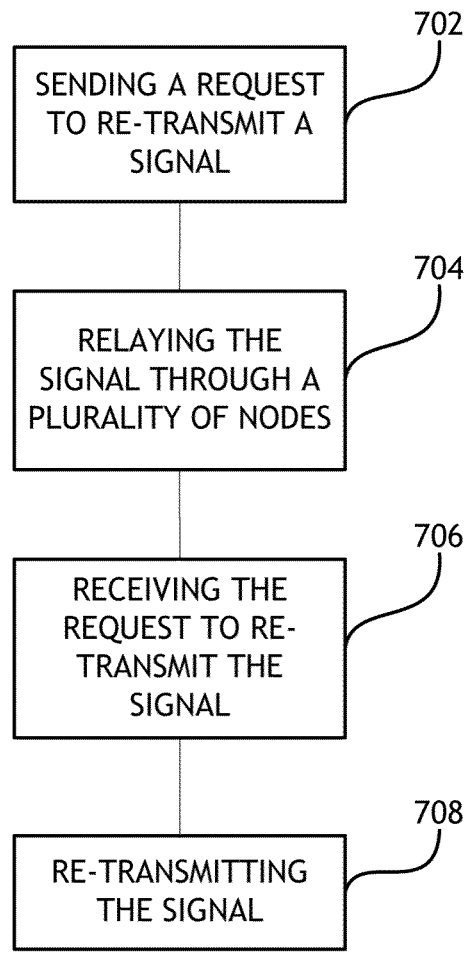
FIG. 8 shows a flowchart of one embodiment of the present invention.

Referring to FIG. 8, another embodiment of the present invention including a method for sending a signal from a radio by a mode beyond the capabilities of the radio is shown. A first radio 102 sends 802 a request to re-transmit a signal by some mode beyond the capabilities of the first radio 102. A second radio 302 receives 806 the request to re-transmit the signal. The second radio 302 may receive the request to re-transmit the signal directly, or the signal may be relayed 804 through a plurality of nodes organized as a network 506. The plurality of nodes may comprise one or more radios, one or more switches incorporated into a physical communications infrastructure, or any other system capable of relaying signals the first radio 102 to the second radio 302. The request to re-transmit the signal may be separate from signal, embedded in the signal or in some other way associated with the signal. The second radio 302 then re-transmits 808 the signal.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A radio apparatus comprising:
    a processor;
    a transmitter functionally connected to the processor;
    a receiver functionally connected to the processor; and
    computer executable program code,
    wherein the computer executable program code is configured to:
        execute a request to re-transmit a signal received through the receiver in a specific mode other than the mode in which the signal was received; and
        broadcast a signal on a common channel indicating that the apparatus is available to re-transmit a signal.

2. The apparatus of claim 1, wherein the computer executable program code is further configured to allow an operator to initiate broadcasting the signal indicating that the apparatus is available to re-transmit a signal.

3. The apparatus of claim 1, wherein the computer executable program code is further configured to stop re-transmitting signals based on an operator's instruction.

4. The apparatus of claim 1, wherein the computer executable program code is further configured to override an operator's instruction to stop re-transmitting signals based on a remotely transmitted override signal.

5. The apparatus of claim 1, wherein the specific mode is configured to be compatible with a HAVE QUICK system.

6. The apparatus of claim 1, wherein the specific mode is configured to be compatible with a SINCGARS system.

7. The apparatus of claim 1, wherein the specific mode is configured for satellite communication.

8. A radio network system comprising:
    a first radio apparatus comprising:
        a processor;
        a transmitter functionally connected to the processor;
        a receiver functionally connected to the processor; and
        computer executable program code; and
    a second radio apparatus comprising:
        a processor;
        a transmitter functionally connected to the processor;
        a receiver functionally connected to the processor; and
        computer executable program code,
    wherein:

the computer executable program code of the first radio apparatus is configured to send a request to re-transmit a signal by a specific mode beyond the capabilities of the first radio apparatus; and the computer executable program code of the second radio apparatus is configured:
- to execute the request to re-transmit a signal by a specific mode; and
- broadcast a signal on a common channel indicating that the second radio apparatus is available to re-transmit a signal.

9. The system of claim 8, further comprising a plurality of transmission nodes, each node comprising an apparatus configured to relay a signal to one or more other nodes in the plurality of transmission nodes, wherein at least one node is configured to receive a signal from the first radio, and at least one node is configured to send a signal to the second radio.

10. The system of claim 9, wherein at least one of the plurality of nodes comprises a radio apparatus.

11. The system of claim 8, wherein the computer executable program code of the second radio apparatus is further configured to allow an operator to initiate broadcasting the signal indicating that the apparatus is available to re-transmit a signal.

12. The system of claim 8, wherein the computer executable program code of the second radio apparatus is further configured to stop re-transmitting signals based on an operator's instruction.

13. The system of claim 8, wherein the computer executable program code of the second radio apparatus is further configured to override an operator's instruction to stop re-transmitting signals based on a remotely transmitted override signal.

14. The system of claim 8, wherein the specific mode is configured to be compatible with a HAVE QUICK system.

15. The system of claim 8, wherein the specific mode is configured to be compatible with a SINCGARS system.

16. The system of claim 8, wherein the specific mode is configured for satellite communication.

17. A method of re-transmitting a signal in a radio network system comprising:
- broadcasting a signal on a common channel indicating that a second radio apparatus is available to re-transmit a signal;
- sending a request to re-transmit a signal from a first radio apparatus in the radio network system;
- receiving the request to re-transmit the signal by the second radio apparatus in the radio network system; and
- re-transmitting the signal,
- wherein the request to re-transmit the signal includes a request to utilize transmission functionality which is native to the second radio apparatus and which is not native to the first radio apparatus.

18. The method of claim 17, further comprising relaying the request to re-transmit the signal through one or more nodes configured to relay the signal.

* * * * *